(12) United States Patent
Zhou (10) Patent No.: US 11,361,475 B2
(45) Date of Patent: Jun. 14, 2022

(54) METHOD AND APPARATUS FOR GENERATING FILE COLOR SCHEME

(71) Applicants: Beijing Kingsoft Office Software, Inc., Beijing (CN); Zhuhai Kingsoft Office Software Co., Ltd., Guangdong (CN); Guangzhou Kingsoft Mobile Technology Co., Ltd., Guangdong (CN)

(72) Inventor: Xian Zhou, Guangdong (CN)

(73) Assignees: Beijing Kingsoft Office Software, Inc.; Zhuhai Kingsoft Office Software, Inc.; Guangzhou Kingsoft Mobile Technology Co., Ltd.

( * ) Notice: Subject to any disclaimer, the term of this patent is extended or adjusted under 35 U.S.C. 154(b) by 298 days.

(21) Appl. No.: 16/605,448

(22) PCT Filed: Apr. 10, 2018

(86) PCT No.: PCT/CN2018/082561
§ 371 (c)(1),
(2) Date: Oct. 15, 2019

(87) PCT Pub. No.: WO2018/196606
PCT Pub. Date: Nov. 1, 2018

(65) Prior Publication Data
US 2020/0126268 A1 Apr. 23, 2020

(30) Foreign Application Priority Data
Apr. 24, 2017 (CN) .......................... 201710272106.0

(51) Int. Cl.
G06T 11/00 (2006.01)
G06T 7/90 (2017.01)
G06F 16/583 (2019.01)

(52) U.S. Cl.
CPC ........ G06T 11/001 (2013.01); G06F 16/5838 (2019.01); G06T 7/90 (2017.01)

(58) Field of Classification Search
CPC ...... G06T 11/001; G06T 7/90; G06F 16/5838
(Continued)

(56) References Cited

U.S. PATENT DOCUMENTS

| 5,745,103 A | 4/1998 | Smith |
| 2005/0093880 A1 | 5/2005 | Kim et al. |

(Continued)

FOREIGN PATENT DOCUMENTS

| CA | 2 594 133 A1 | 1/2009 |
| CN | 1973303 A | 5/2007 |

(Continued)

OTHER PUBLICATIONS

ChengSheng et al., "Development of supporting tools for color matching for information visualization using PCCS", IPSJ SIG Technical Report, vol. 2017-HCI-172; No. 12 (2017).

*Primary Examiner* — Michael R Neff
(74) *Attorney, Agent, or Firm* — McDonnell Boehnen Hulbert & Berghoff LLP (57) ABSTRACT

Disclosed are a method and an apparatus for generating a file color scheme. The method includes: acquiring a picture in a target file (S101); performing color analysis on the picture to obtain a first color set of the picture and then determining a target color set of the target file (S102); determining a collocated color set that matches the color set (S103); generating a color scheme of the target file using the collocated color set (S104). The above solution can achieve the generation of a color scheme according to a color of a picture in the file, reducing the workload of the user in generating the color scheme, and improving the visual effect of the target file.

16 Claims, 4 Drawing Sheets

(58) Field of Classification Search
 USPC .......................................................... 382/165
 See application file for complete search history.

(56) References Cited

U.S. PATENT DOCUMENTS

| | | | |
|---|---|---|---|
| 2011/0252344 | A1 | 10/2011 | van Os |
| 2012/0308210 | A1 | 12/2012 | Ubillos |
| 2016/0041957 | A1* | 2/2016 | Finsterwald ........... G06Q 10/10 715/202 |

FOREIGN PATENT DOCUMENTS

| | | |
|---|---|---|
| CN | 101706718 | 5/2010 |
| CN | 102047293 A | 5/2011 |
| CN | 103325107 A | 9/2013 |
| CN | 103577993 A | 2/2014 |
| CN | 105912321 | 8/2016 |
| CN | 106204678 | 12/2016 |
| CN | 106780635 | 5/2017 |
| JP | H02194773 A | 8/1990 |
| JP | H096325 A | 1/1997 |
| JP | 2011029856 A | 2/2011 |

\* cited by examiner

METHOD AND APPARATUS FOR GENERATING FILE COLOR SCHEME

The present application is a U.S. national phase application of International Patent Application No. PCT/CN2018/082561, filed Apr. 10, 2018 which claims the priority to Chinese Patent Application No. 201710272106.0, filed with the China National Intellectual Property Administration on Apr. 24, 2017 and entitled "Method and apparatus for generating a file color scheme", which are hereby incorporated herein by reference in their entirety.

TECHNICAL FIELD

The present application relates to the field of Internet technology, and in particular, to a method and an apparatus for generating a file color scheme.

BACKGROUND

In editing a file, a user often adds a picture for additional explanation of the file or creates an atmosphere, and also sets a color of the file by a font color, a title color, a paragraph color, a background color and the like, so as to highlight the content of the file, beautify the display of the file, and improve the visual effect of the file. However, for a user in a non-design industry, it is very difficult to make a file with good color matching overall and better visual experience.

In order to solve this problem, at present, a user can select a color scheme better matched with the file when issuing a file, wherein the color scheme includes a font color, a title color, a paragraph color, a background color, and the like. However, when the user modifies/adds a picture in the file, the selected color scheme may not match the modified/added picture in the file, thus affecting the visual effect of the file. At this time, in order to improve the visual effect of the file, the user needs to adjust the selected color scheme to generate a new color scheme, which greatly increases workload.

SUMMARY

The object of the embodiment of the present application is to provide a method and apparatus for generating a file color scheme, which can achieve the generation of a color scheme based on a color of a picture in a file, reduce the workload of generating the color scheme, and improve the visual effect of the file. Specifically, the technical solutions are as follows.

In a first aspect, an embodiment of the present application provides a method for generating a file color scheme, comprising:

acquiring a target color set of a picture in a target file;

determining a collocated color set that matches the target color set; and generating a color scheme of the target file using the collocated color set.

Optionally, acquiring a target color set of a picture in a target file comprises:

acquiring a changed picture in the target file;

performing color analysis on the changed picture to obtain a first color set of the changed picture; and determining the target color set of the picture in the target file according to the first color set.

Optionally, performing color analysis on the changed picture to obtain a first color set of the changed picture comprises:

performing color analysis on the changed picture to obtain colors included in the changed picture and a color ratio of each of the colors; and determining the first color set of the changed picture according to the colors included in the changed picture and the color ratio of each of the colors.

Optionally, determining the first color set of the changed picture according to the colors included in the changed picture and the color ratio of each of the colors comprises:

selecting, from the colors included in the changed picture, a color whose color ratio is greater than a preset color ratio threshold to obtain the first color set of the changed picture; or selecting, from the colors included in the changed picture, a preset threshold number of colors having the highest color ratios, to obtain the first color set of the changed picture.

Optionally, determining a target color set of a picture in the target file according to the first color set comprises:

determining the first color set as the target color set of the target file; or merging the first color set and a second color set to obtain the target color set of the target file, wherein the second color set is a color set of an unchanged picture in the target file.

Optionally determining a collocated color set that matches the target color set comprises:

determining a collocated color corresponding to each of colors in the target color set; and selecting a collocated color whose matching degree with each of the colors in the target color set is greater than a preset matching degree threshold to obtain the collocated color set.

Optionally, generating a color scheme of the target file using the collocated color set comprises:

determining at least one of a font color, a title color, a background color and a paragraph color of the target file by using a collocated color in the collocated color set, to obtain the color scheme of the target file.

In a second aspect, an embodiment of the present application provides an apparatus for generating a file color scheme, comprising:

an acquiring module configured for acquiring a target color set of a picture in a target file;

a collocated color determining module configured for determining a collocated color set that matches the target color set; and a color scheme generating module configured for generating a color scheme of the target file using the collocated color set.

Optionally, the acquiring module comprises:

an acquiring submodule configured for acquiring a changed picture in the target file;

a color analysis submodule configured for performing color analysis on the changed picture to obtain a first color set of the changed picture; and a color set determining submodule configured for determining the target color set of the target file according to the first color set.

Optionally, the color analysis submodule is configured for:

performing color analysis on the changed picture to obtain colors included in the changed picture and a color ratio of each of the colors; and determining the first color set of the changed picture according to the colors included in the changed picture and the color ratio of each of the colors.

Optionally, the color analysis submodule is configured for:

selecting, from the colors included in the changed picture, a color whose color ratio is greater than a preset color ratio threshold to obtain the first color set of the changed picture; or selecting, from the colors included in the changed picture, a preset threshold number of colors having the highest color ratios, to obtain the first color set of the changed picture.

Optionally, the color set determining submodule is configured for:

determining the first color set as the target color set of the picture in the target file; or merging the first color set and a second color set to obtain the target color set of the picture in the target file, wherein the second color set is a color set of an unchanged picture in the target file.

Optionally, the collocated color determining module is configured for:

determining a collocated color corresponding to each of colors in the target color set; and selecting a collocated color whose matching degree with each of the colors in the target color set is greater than a preset matching degree threshold to obtain the collocated color set.

Optionally, the color scheme generating module is configured for:

determining at least one of a font color, a title color, a background color and a paragraph color of the target file by using a collocated color in the collocated color set, to obtain the color scheme of the target file.

In a third aspect, an embodiment of the present application provides an electronic device including a processor and a memory, wherein the memory stores a computer program, and the processor executes the program stored on the memory to perform the above method for generating a file color scheme.

In a fourth aspect, an embodiment of the present application provides a machine readable storage medium, wherein a computer program is stored in the machine readable storage medium, and the computer program, when executed by the processor, performs the above method for generating a file color scheme.

In a fifth aspect, an embodiment of the present application provides a computer program which, when executed by a processor, performs the above method of generating a file color scheme.

In the method and apparatus for generating a file color scheme according to embodiments of the present application, a collocated color set is determined for a color set of a picture in the target file, and then a color scheme of the target file is generated using the collocated color set. In this way, the method and apparatus can achieve the generation of a color scheme according to the colors of the picture in the file, reduce the workload of the user in generating a color scheme, and improve the visual effect of the file. It should be understood that any product or method of the present application does not necessarily have all of the advantages described above.

BRIEF DESCRIPTION OF THE DRAWINGS

In order to more clearly describe the technical solution of the embodiments of the application or of the prior art, drawings needed in the embodiments and the prior art will be briefly described below. Apparently, the drawings described below are for only some embodiments of the present application. One of ordinary skills in the art can also obtain other drawings based on these drawings without any creative efforts.

DETAILED DESCRIPTION

The technical solution of the application will be described clearly and completely with reference to the drawings of embodiments of the present application. Apparently, the embodiments described are only some, not all, of embodiments of the present application. An other embodiments obtained by one of ordinary skills in the art based on the embodiments without any creative effort are within the scope of the present application.

In order to solve the problem in the prior art, embodiments of the present application provide a method and an apparatus for generating a file color scheme, which is capable of achieving the generation of a color scheme based on a color of a picture in a file, reducing the workload of the user in generating a color scheme, and improving the visual effect of the file.

The method for generating a file color scheme may be applied to electronic devices such as mobile phones, tablet computers, computers, and the like. The method for generating a file color scheme includes: acquiring a target color set of a picture in a target file; determining a collocated color set matching the target color set; generating a color scheme of the target file using a color matching set.

In an embodiment of the present application; by determining the collocated color set for the color set of the picture in the target file, and then generating a target file color scheme using the collocated color set, the generation of a color scheme based on the color of the picture in the file is achieved, the workload of the user is reduced in generating the color scheme, and the visual effect of the target file is improved.

Figure 1:
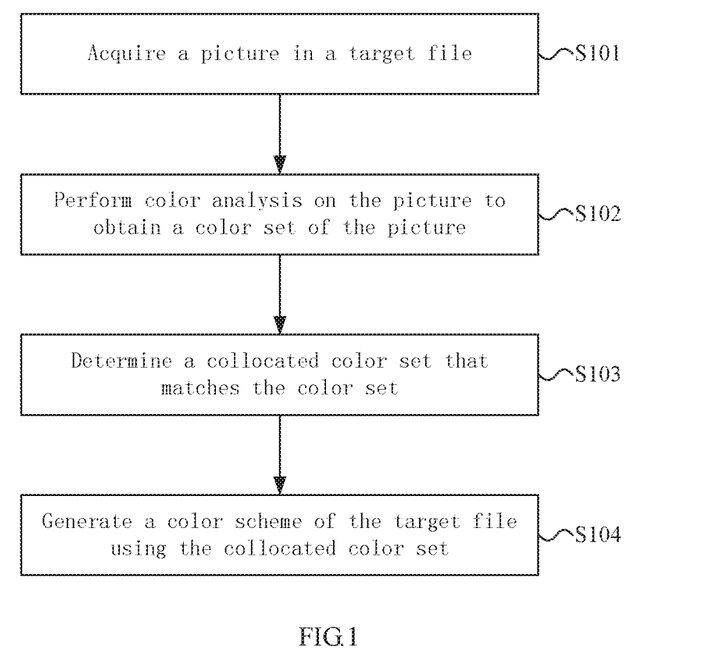
FIG. 1 is a flowchart of a method for generating a file color scheme according to an embodiment of the present application.

Hereafter, a method for generating a file color scheme according to an embodiment of the present application is introduced. As shown in FIG. 1, FIG. 1 is a flowchart of a method for generating a file color scheme according to an embodiment of the present application. The method may include:

S101, acquiring a picture in a target file.

In an implementation of the application, in the S101, a changed picture in the target file is obtained. The changed picture may be understood as a picture that has changed in the target file. The change may be the new addition of a picture, or may be a change in the content of an existing picture. For example, the changed picture may be a newly added picture, or may be an existing picture which has changed in the target file.

The acquired picture may be one or more pictures in the target file.

In an implementation, in order to acquire a changed picture in the target file in the S101, it is possible to detect whether a changed picture exists in the target file in real time. When it is detected that a changed picture exists in the target file, the changed picture in the target file is acquired. In this way, it is not necessary to perform color analysis on all the pictures in the target file in subsequent steps, which reduces the number of pictures on which the color analysis will be performed in the subsequent steps, the memory usage of the electronic device during the color analysis, the time of the color analysis and the time overhead.

According to the foregoing description of the method for generating a file color scheme, it is necessary to acquire a target color set to generate a file color scheme. In view of this, all colors of an unchanged picture in the target file may be stored in an apparatus using the method for generating a file color scheme according to the embodiment of the present application. In the subsequent steps, the target color set can be obtained based on the colors of the changed picture and the colors of the unchanged picture.

That is, all the colors of an unchanged picture in the target file may be acquired in advance, and the acquired colors may be stored. In this way, in subsequently obtaining the target color set, it is not necessary to acquire the unchanged picture in the target file, but it is possible to directly use the stored colors of the unchanged picture to obtain the target color set.

For example, the target file is a file A, and the file A includes a picture A, a picture B, and a picture C. The user adds a picture D to the file A, and thus the picture D is a changed picture. Therefore, the acquired picture is the picture D.

In another implementation of the present application, in the S101, all pictures in the target file are acquired.

In an implementation, in order to acquire all pictures in the target file in the S101, a "generate color scheme" button may be preset. After adding all the pictures in the file, the user clicks the preset "generate color scheme" button. At this time, all the pictures in the file are acquired. With this implementation, the number of times of performing subsequent steps and the memory usage of the electronic device in the subsequent steps can be reduced.

The electronic device, when detecting that the user clicks the "generate color scheme" button, determines that the user inputs an instruction indicating the completion of the file, and acquires all the pictures in the file.

For example, the target file is a file B, and there is no picture in the file B before adding a picture in the file B. The user adds three pictures E, F, and G in file B, and clicks the preset "generate color scheme" button. At this time, three pictures E, F, and G in the file B are acquired.

S102, performing color analysis on the picture to obtain a color set in the picture.

In an implementation of the present application, in case a changed picture in the target file is acquired in the S101, the S102 includes performing the color analysis on the changed picture to obtain a first color set of the changed picture, and determining a target color set of the picture in the target file according to the first color set.

The first color set may include all colors of the changed picture, and may also include a part of the colors of the changed picture. This is not limited in the embodiment of the present application.

Here, the performance of the color analysis on the changed picture is to obtain the target color set in the picture in the target file. Then the color scheme can be generated in the subsequent steps.

Due to the variety of picture formats, the color analysis of pictures may be performed using different color modes according to different picture formats. For example, a RGB mode may be used to perform the color analysis on a picture, or a YUV mode may be used to perform the color analysis on a picture.

For example, in performing the color analysis through the RGB mode, the picture can be analyzed using three primary colors, so that RGB value corresponding to each of the colors in the picture can be obtained in detail and accurately. The three primary colors of the paint are yellow, magenta and cyan, and the three primary colors of light are red, green and blue. In theory, any color can be obtained using these primary colors.

Considering the hardware limitation of the electronic device, in order to reduce the complexity of color analysis, the color analysis of a picture can be performed by reference colors. Hereafter, Table 1 shows a correspondence between a reference color and a RGB value provided by the embodiment of the present application.

TABLE 1

| Reference color | Red | Green | Blue |
|---|---|---|---|
| black | 0 | 0 | 0 |
| blue | 0 | 0 | 255 |
| green | 0 | 255 | 0 |
| cyan | 0 | 255 | 255 |
| red | 255 | 0 | 0 |
| magenta | 255 | 0 | 255 |
| yellow | 255 | 255 | 0 |
| white | 255 | 255 | 255 |
| orange | 255 | 125 | 0 |
| gray | 192 | 192 | 192 |
| brown | 128 | 42 | 42 |
| pink | 255 | 192 | 203 |

In an implementation of the present application, in case all the pictures in the target file are acquired in the S101, the S102 includes acquiring colors included in each picture in the target file, and determining the target color set based on the obtained colors.

S103, determining a collocated color set that matches the color set.

The S103 is to determine a collocated color set that matches the target color set.

Each of the colors collocates with at least one color, that is, at least one collocated color.

After obtaining the target color set of the picture in the target file in step S102, in order to obtain a color scheme collocated with the picture, it is necessary to determine a collocated color set that matches the target color set.

Specifically, a collocated color of each of the colors in the target color set may be determined first, and then a collocated color set is established based on the collocated color of each of the colors.

By establishing the collocated color set, a plurality of collocation schemes are provided for selection in generating a color scheme, thereby improving the selectivity in generating a color scheme.

In the embodiment of the present application, the collocated color may obtained according to a large amount of color collocation data.

S104, generating a color scheme of the target file using the collocated color set.

In this step, the color scheme may assign a color to parts of the target file except for the pictures, for example, assign a font color and a background color. The color scheme includes colors that are assigned to each part in the target file.

Specifically one collocated color may be selected in the collocated color set, and the selected collocated color is used for each part of the target file except for the pictures, thereby obtaining a color scheme.

It is also possible to select a plurality of collocated colors in the collocated color set, and select a corresponding collocated color for each part in the target file except for the pictures from the selected collocated colors, thereby obtaining a color scheme.

It is also possible to select a color that is close to the colors in the collocated color set to generate a color scheme.

In the embodiment of the present application, the foregoing several examples of generating a color scheme are used to illustrate the process of the S104 more clearly, and do not limit the S104.

In the method for generating a file color scheme according to an embodiment of the present application, a collocated color set is determined for a color set of the picture in the target file, and then a color scheme of the target file is generated using the collocated color set. In this way, the method can achieve the generation of a color scheme according to the colors of the picture in the file, reduce the workload of the user in generating the color scheme, and improve the visual effect of the file. In addition, the color scheme can be flexibly changed according to the change of the picture, so that the user can use the color scheme more flexibly.

When there are a lot of colors in the picture in the file, more colors will be obtained after the color analysis. If a color set is composed of all the colors of the changed picture, the complexity of generating a color scheme will increase. Therefore, the embodiment of the present application provides the following implementation.

The color analysis is performed on the changed picture to obtain colors included in the changed picture and a color ratio of each of the colors; and a first color set of the changed picture is determined based on the colors included in the changed picture and the color ratio of each of the colors. By way of this implementation, the number of colors included in the first color set is reduced, thereby reducing the number of colors included in the target color set, and reducing the complexity of generating a color scheme.

Based on the implementation of determining the first color set, in one possible implementation, the performing of the color analysis on the changed picture to obtain a first color set of the changed picture may include the following steps.

At first step, the color analysis is performed on the changed picture to obtain the colors included in the changed picture and the color ratio of each of the colors.

In the color analysis of the changed picture, the changed picture may be decomposed in pixels to obtain a color of each of the pixels in the changed picture, and then statistics is made on colors of all the pixels in the picture to obtain the area of pixels for each of the colors in the picture, that is, the color ratio of the number of pixels for each of the colors to the total number of pixels in the picture is calculated, thereby obtaining the color ratio of each of the colors.

Here, a color of a pixel may be represented by an RGB value, or may be represented by a YUV value, which is not limited in the embodiment of the present application.

At second step, from the colors included in the changed picture, at least one color whose color ratio is greater than a preset color ratio threshold is selected to obtain a first color set of the changed picture.

The preset color ratio threshold may be set according to an actual application. The number of colors in the first color set can be reduced by selecting a color whose color ratio is greater than a preset color ratio threshold.

However, when the ratios of the various colors in the changed picture are relatively balanced, and the preset color ratio threshold is relatively large, no color for establishing a first color set may be selected, that is, the first color set includes no element; or when the preset color ratio threshold is relatively small, more colors may be selected, and thus the established first color set includes more colors.

In this regard, the embodiment of the present application also provides another possible implementation.

Based on the foregoing implementation of determining the first color set, in this possible implementation, performing the color analysis on the changed picture to obtain a first color set of the changed picture in step S102 may include the following steps.

At first step, the color analysis is performed on the changed picture to obtain the colors included in the changed picture and the color ratio of each of the colors.

At second step, from the colors included in the changed picture, a preset threshold number of colors having the highest color ratios are selected, to obtain the first color set of the changed picture.

In one embodiment, in order to select a preset threshold number of colors having the highest color ratios, this second step may include:

arranging the colors in the picture based on their color ratios from high to low; and selecting the first preset threshold number of colors starting from a color with the highest color ratio, to obtain the first color set.

The preset threshold number is pre-set to select a preset number of colors.

For example, the file A includes changed pictures A, B and C. By performing color analysis on pictures A, B and C, it is determined that the picture A contains black, blue, red and purple, the picture B contains blue, cyan, yellow, orange and white, and the picture C contains pink, purple, brown, magenta; and the ratio of black is 21%, the ratio of blue is 17%, the ratio of red is 5%, the ratio of purple is 14%, the ratio of cyan is 6%, the ratio of yellow is 16%, the ratio of orange is 5%, the ratio of white is 1%, the ratio of pink is 2%, and the ratio of brown is 3%. Here, the preset threshold number is 4.

The above colors are arranged based on their color ratios from high to low, i.e., black→blue→yellow→purple→cyan→red→orange→brown→pink→white.

Since the preset threshold number is 4, the selected colors are in sequence: black, blue, yellow and purple, and then these four colors form the first color set.

With this implementation, the preset threshold number of colors can be selected according to actual needs, thereby further reducing the number of colors in the first color set.

In a possible implementation, determining a target color set of a picture in the target file according to the first color set may include:

if the changed picture acquired in the S101 are all the pictures in the target file, determining the first color set as the target color set of the target file; and if the changed picture acquired in the S101 is a part of pictures in the target file, merging the first color set and the second color set to obtain a target color set of the target file.

The second color set is a color set of the unchanged picture in the target file. The electronic device has stored the color set of the unchanged picture, so the second color set can be directly acquired from the electronic device.

In the embodiment of the present application, in order to reduce the complexity of implementing the embodiment of the present application, the collocated color set that matches the color set may be determined by the following steps.

At first step, a collocated color corresponding to each of the colors in the target color set is determined.

In an embodiment, a collocated color library including the correspondence between a color and a collocated color may be pre-established. After obtaining the target color set, a collocated color corresponding to each of the colors in the target color set is determined by searching the pre-established collocated color library.

At second step, a collocated color whose matching degree with each of the colors in the target color set is greater than a preset matching degree threshold is selected to obtain a collocated color set.

That is, for each of the determined collocated colors, a matching degree of this collocated color with each of the colors in the target color set is determined. A collocated color whose matching degree with each of the colors in the target color set is greater than a preset matching degree threshold is selected to obtain a collocated color set.

The preset matching degree threshold is pre-set in actual applications, and the matching degree indicates the similarity of one color and the other color which is a reference color.

In the calculation of matching degrees, one of the collocated colors corresponding to the colors in the target color set is taken as a reference color, and a matching degree of this collocated color with each of the colors in the target color set may be calculated, respectively. This is repeated until the matching degrees of each of the collocated colors with all the colors in the color set have been calculated. Then, a collocated color(s) is selected from the collocated colors by the preset matching degree threshold to obtain a collocated color set. The obtained collocated color set is more suitable for generating a color scheme.

For example, the determined collocated colors include red, green and blue, the target color set includes three colors: yellow, orange and white, and the preset matching degree threshold is 0.50.

In the calculation of matching degrees, firstly, the collocated color of red is taken as a reference color, and the matching degrees of the red and the three colors of yellow, orange and white in the target color set are calculated, respectively; secondly, the collocated color of green is taken as a reference color, and the matching degrees of the green and the three colors of yellow, orange and white in the target color set are calculated, respectively; and finally, the collocated color of blue is taken as a reference color, and the matching degrees of the blue and the three colors of yellow, orange and white in the target color set are calculated, respectively.

For example, the matching degree of the red and the yellow is 0.61, the matching degree of the red and the orange is 0.83, and the matching degree of the red and the white is 0.55; the matching degree of the green and the yellow is 0.86, the matching degree of the green and the orange is 0.75, and the matching degree of the green and the white is 0.90; the matching degree of the blue and the yellow is 0.92, the matching degree of the blue and the orange is 0.56, and the matching degree of the blue and the white is 0.39.

It can be seen that the matching degrees of the red and the yellow, orange and white in the target color set are greater than the preset matching degree threshold of 0.5, and the matching degrees of the green and the yellow, orange and white in target color set are also greater than the preset matching degree threshold of 0.5, the red and the green may be selected as elements in the target color set. Since the matching degree of the blue and the white is 0.39, which is less than the preset matching degree threshold, the blue cannot be determined as an element in the target color set.

Therefore, the red and the green may be selected to establish a collocated color set.

In an embodiment of the present application, a matching degree between colors may be calculated by various methods. For example, a matching degree between different colors may be calculated by mapping RGB values of different colors into a three-dimensional space and calculating a Euclidean distance between the different colors. For example, a matching degree between different colors may be calculated by the HSV (Hue Saturation Value) spatial model.

In a possible implementation, the color scheme includes at least one of a font color, a title color, a background color, and a paragraph color. The electronic device configures the target file according to the color included in the color scheme. For example, if the color scheme includes a font color of red, the electronic device configures a font color in the target file to be red.

At this time, generating a color scheme of the target file using the collocated color set may include:

determining at least one of a font color, a background color and a paragraph color of the target file by using a collocated color in the collocated color set to obtain the color scheme of the target file.

For example, one collocated color is selected from the collocated color set as one of the font color, the title color, the background color, and the paragraph color. For another example, two collocated colors are selected from the collocated color set as two colors of the font color, the title color, the background color and the paragraph color.

In case the color scheme includes at least one of a font color, a background color, a title color and a paragraph color, the collocated color set may correspondingly include a collocated color subset of the font color, a collocated color subset of the background color, a collocated color subset of the title color and a collocated color subset of the paragraph color.

Figure 2:
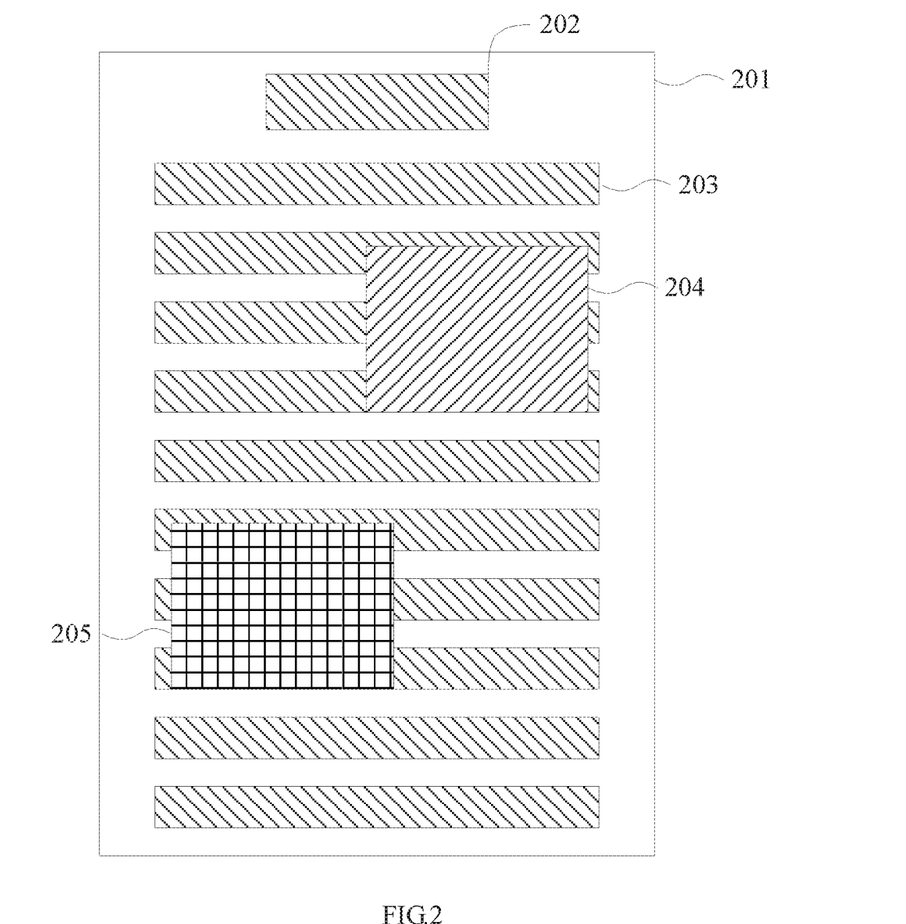
FIG. 2 is a schematic diagram of a file to which the method for generating a file color scheme according to the embodiment of the present application is not applied.

In order to illustrate the implementation effect of the embodiment of the present application more clearly, the embodiment of the present application is described below with reference to FIG. 2 and FIG. 3. FIG. 2 is a schematic diagram of a file to which the method for generating a file color scheme according to the embodiment of the present application is not applied.

In FIG. 2, a file 201 is a file to which the method for generating a file color scheme according to the embodiment of the present application is not applied. A title 202 is a title to which the method for generating a file color scheme according to the embodiment of the present application is not applied. A text 203 is a text to which the method for generating a file color scheme according to the embodiment of the present application is not applied. A picture 204 and a picture 205 are in the file 201.

In the method for generating a file color scheme according to the embodiment of the present application, firstly, the picture 204 and the picture 205 are acquired and color analysis is performed on the picture 204 and the picture 205 to obtain all colors included in the picture 204 and the picture 205; a target color set is then established based on all the colors; a collocated color set that matches the target color set is then determined; and a color scheme of the target file is then generated by using the collocated color set.

In a possible implementation, in the generated color scheme of the target file, the background color, the text color and the title color of the file may be different colors. For example, as shown in FIG. 3, FIG. 3 is a schematic diagram of a file to which the method of generating a file color scheme according to the embodiment of the present application is applied.

Figure 3:
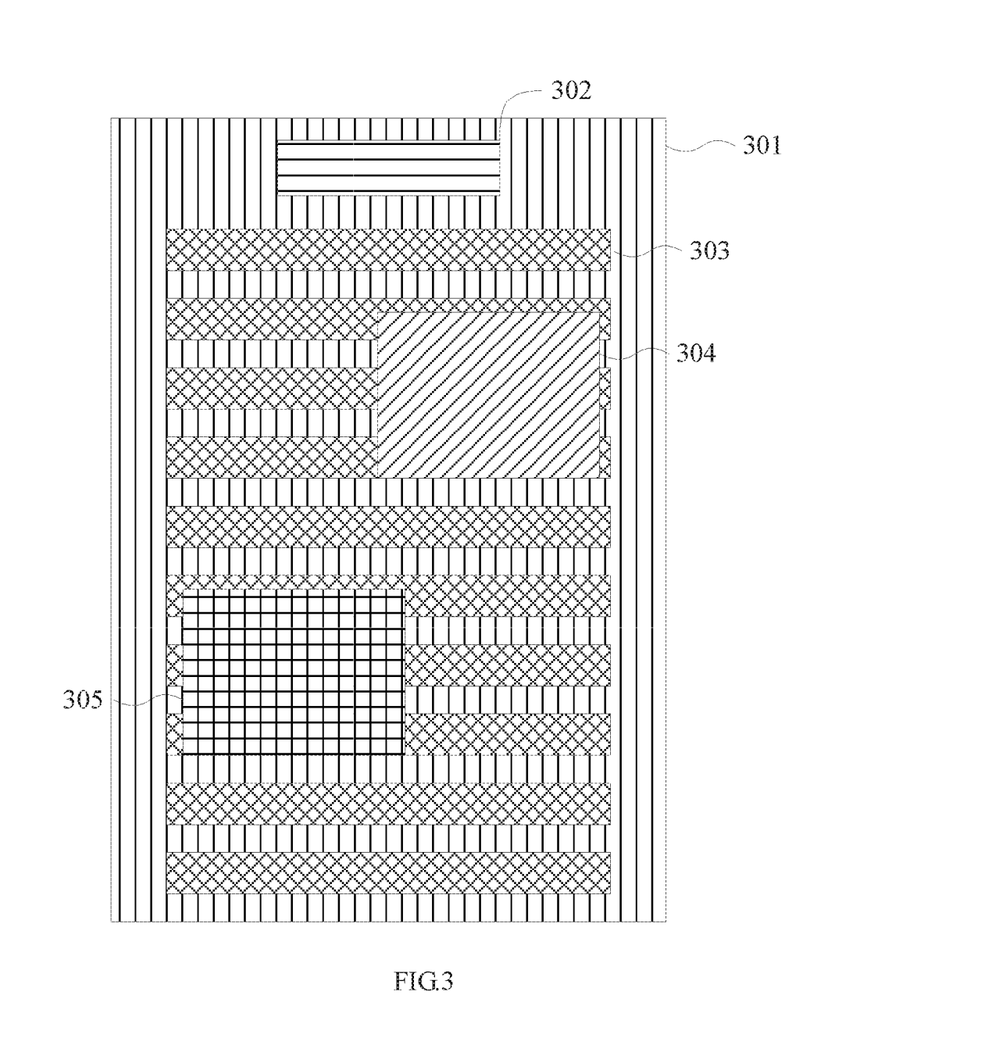
FIG. 3 is a schematic diagram of a file to which the method for generating a file color scheme according to the embodiment of the present application is applied.

In FIG. 3, a file 301 has a background color generated by the method of generating a file color scheme according to the embodiment of the present application. A title 302 has a title color generated by the method of generating a file color scheme according to the embodiment of the present application. A text 303 has a text color generated by the method of generating a file color scheme according to the embodiment of the present application.

FIGS. 2 and 3 are only used for more clearly explaining the embodiment of the present application. In practical applications, the portions indicated by reference signs in FIGS. 2 and 3 may have different colors.

Figure 4:
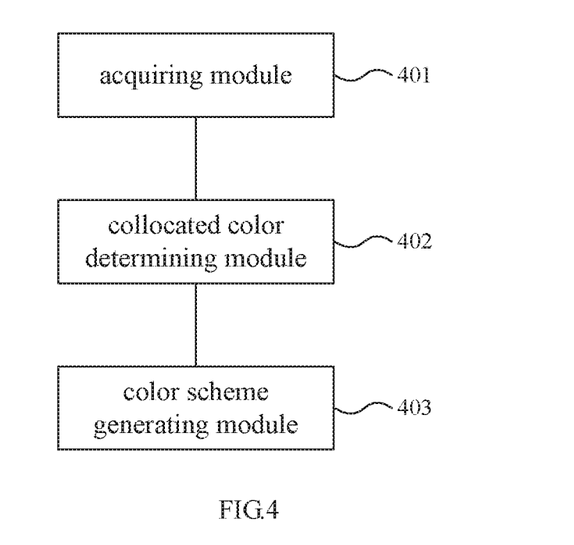
FIG. 4 is a structural diagram of an apparatus for generating a file color scheme according to an embodiment of the present application.

Corresponding to the embodiment of the above method for generating a file color scheme, an embodiment of the present application provides an apparatus for generating a file color scheme. FIG. 4 is a structural diagram of an apparatus for generating a file color scheme according to an embodiment of the present application. The apparatus may include:

an acquiring module 401 configured for acquiring a target color set of a picture in a target file;

a collocated color determining module 402 configured for determining a collocated color set that matches the target color set; and a color scheme generating module 403 configured for generating a color scheme of the target file using the collocated color set.

In a possible implementation, the acquiring module 401 includes:

an acquiring submodule configured for acquiring a changed picture in the target file;

a color analysis submodule configured for performing color analysis on the changed picture to obtain a first color set of the changed picture; and a color set determining submodule configured for determining the target color set of the picture in the target file according to the first color set.

In a possible implementation, the color analysis submodule may be specifically configured for:

performing color analysis on the changed picture to obtain colors included in the changed picture and a color ratio of each of the colors; and determining the first color set of the changed picture according to the colors included in the changed picture and the color ratio of each of the colors.

In a possible implementation, the color analysis submodule may be specifically configured for:

selecting, from the colors included in the changed picture, a color whose color ratio is greater than a preset color ratio threshold to obtain the first color set of the changed picture; or selecting, from the colors included in the changed picture, a preset threshold number of colors having the highest color ratios, to obtain the first color set of the changed picture.

In a possible implementation, the color set determining submodule may be specifically configured for:

determining the first color set as the target color set of the picture in the target file; or merging the first color set and a second color set to obtain the target color set of the picture in the target file, wherein the second color set is a color set of an unchanged picture in the target file.

In a possible implementation, the collocated color determining module 402 may be specifically configured for:

determining a collocated color corresponding to each of colors in the target color set; and selecting a collocated color whose matching degree with each of the colors in the target color set is greater than a preset matching degree threshold to obtain the collocated color set.

In a possible implementation, the color scheme generating module 403 may be specifically configured for determining at least one of a font color, a title color, a background color and a paragraph color of the target file by using a collocated color in the collocated color set, to obtain the color scheme of the target file.

In the embodiment of the present application, a collocated color set is determined for a color set of a picture in the target file, and then a color scheme of the target file is generated using the collocated color set. In this way, the generation of a color scheme according to the colors of the picture in the file is achieved, the workload of the user in generating a color scheme is reduced, and the visual effect of the file is improved.

Figure 5:
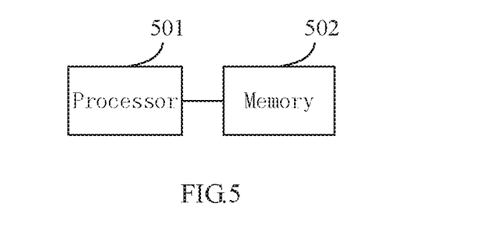
FIG. 5 is a structural diagram of an electronic device according to an embodiment of the present application.

Based on the same inventive concept, an embodiment of the present application further provides an electronic device. As shown in FIG. 5, the electronic device includes a processor 501 and a memory 502. The memory 502 stores a computer program, and the processor 501 executes the program stored on the memory 502, to perform the above method for generating a file color scheme. Specifically, the method for generating a file color scheme includes:

acquiring a target color set of a picture in a target file;

determining a collocated color set that matches the target color set; and generating a color scheme of the target file using the collocated color set.

In the embodiment of the present application, a collocated color set is determined for a color set of a picture in the target file, and then a color scheme of the target file is generated using the collocated color set. In this way, the generation of a color scheme according to the colors of the picture in the file is achieved, the workload of the user in generating a color scheme is reduced, and the visual effect of the file is improved.

Based on the same inventive concept, an embodiment of the present application further provides a machine readable storage medium. A computer program is stored in the machine readable storage medium. The computer program, when executed by a processor, performs the above method for generating a file color scheme. Specifically, the method for generating a file color scheme includes:

acquiring a target color set of a picture in a target file;

determining a collocated color set that matches the target color set; and generating a color scheme of the target file using the collocated color set.

In the embodiment of the present application, a collocated color set is determined for a color set of a picture in the target file, and then a color scheme of the target file is generated using the collocated color set. In this way, the generation of a color scheme according to the colors of the picture in the file is generated, the workload of the user in generating a color scheme is reduced, and the visual effect of the file is improved.

Based on the same inventive concept, an embodiment of the present application further provides a computer program which, when executed by the processor, performs the method for generating a file color scheme. Specifically, the method for generating a file color scheme includes:

acquiring a target color set of a picture in a target file;

determining a collocated color set that matches the target color set; and generating a color scheme of the target file using the collocated color set.

In the embodiment of the present application, a collocated color set is determined for a color set of a picture in the target file, and then a color scheme of the target file is generated using the collocated color set. In this way, the generation of a color scheme according to the colors of the picture in the file is achieved, the workload of the user in generating a color scheme is reduced, and the visual effect of the file is improved.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus for generating a file color scheme, the electronic device, machine readable storage medium and the computer program are described briefly, since they are substantially similar to the embodiment of the method for generating a file color scheme, and the related contents can refer to the description of the embodiment of the method for generating a file color scheme.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for generating a file color scheme, comprising:
   acquiring a picture in a target file, wherein the picture comprises colors;
   based on a color ratio of each of the colors included in the picture obtained from color analysis on the picture, acquiring a target color set of the picture;
   determining a collocated color set that matches the target color set; and
   generating a color scheme of the target file using the collocated color set.

2. The method according to claim 1, wherein, the picture is a changed picture in the target file, wherein the picture comprises colors, and wherein, based on the color ratio of each of the colors included in the picture obtained from color analysis on the picture, acquiring the target color set of the picture comprises:
   performing color analysis on the changed picture in the target file to obtain a first color set of the changed picture; and
   determining the target color set of the picture in the target file according to the first color set.

3. The method according to claim 2, wherein, performing color analysis on the changed picture to obtain the first color set of the changed picture comprises:
   performing color analysis on the changed picture to obtain colors included in the changed picture and the color ratio of each of the colors; and
   determining the first color set of the changed picture according to the colors included in the changed picture and the color ratio of each of the colors.

4. The method according to claim 3, wherein, determining the first color set of the changed picture according to the colors included in the changed picture and the color ratio of each of the colors comprises:
   selecting, from the colors included in the changed picture, a color whose color ratio is greater than a preset color ratio threshold to obtain the first color set of the changed picture; or
   selecting, from the colors included in the changed picture, a preset threshold number of colors having the highest color ratios to obtain the first color set of the changed picture.

5. The method according to claim 2, wherein determining the target color set of the picture in the target file according to the first color set comprises:
   determining the first color set as the target color set of the picture in the target file; or
   merging the first color set and a second color set to obtain the target color set of the picture in the target file, wherein the second color set is a color set of an unchanged picture in the target file.

6. The method according to claim 1, wherein determining the collocated color set that matches the target color set comprises:
   determining a collocated color corresponding to each of colors in the target color set; and
   selecting a collocated color whose matching degree with each of the colors in the target color set is greater than a preset matching degree threshold to obtain the collocated color set.

7. The method according to claim 1, wherein generating the color scheme of the target file using the collocated color set comprises:
   determining at least one of a font color, a title color, a background color and a paragraph color of the target file by using a collocated color in the collocated color set, to obtain the color scheme of the target file.

8. An electronic device, comprising: a processor and a memory, wherein the memory is configured to store a computer program; and the processor is configured to execute the program stored on the memory to perform the method of claim 1.

9. A non-transitory machine readable storage medium, wherein a computer program is stored in the machine readable storage medium, and the computer program, when executed by a processor, performs the method of claim 1.

10. An apparatus for generating a file color scheme, comprising a memory that stores executable modules; and a processor, coupled to the memory, that executes the executable modules, the executable modules comprising:
- an acquiring module configured for acquiring a picture in a target file, wherein the picture comprises colors, and based on a color ratio of each of the colors included in the picture obtained from color analysis on the picture, acquiring a target color set of the picture;
- a collocated color determining module configured for determining a collocated color set that matches the target color set; and
- a color scheme generating module configured for generating a color scheme of the target file using the collocated color set.

11. The apparatus according to claim 10, wherein the acquiring module comprises:
- an acquiring submodule configured for acquiring a changed picture in the target file;
- a color analysis submodule configured for performing color analysis on the changed picture to obtain a first color set of the changed picture; and
- a color set determining submodule configured for determining the target color set of the picture in the target file according to the first color set.

12. The apparatus according to claim 11, wherein the color analysis submodule is configured for:
- performing color analysis on the changed picture to obtain colors included in the changed picture and a color ratio of each of the colors; and
- determining the first color set of the changed picture according to the colors included in the changed picture and the color ratio of each of the colors.

13. The apparatus according to claim 12, wherein the color analysis submodule is configured for:
- selecting, from the colors included in the changed picture, a color whose color ratio is greater than a preset color ratio threshold to obtain the first color set of the changed picture; or
- selecting, from the colors included in the changed picture, a preset threshold number of colors having the highest color ratios to obtain the first color set of the changed picture.

14. The apparatus according to claim 11, wherein the color set determining submodule is configured for:
- determining the first color set as the target color set of the picture in the target file; or
- merging the first color set and a second color set to obtain the target color set of the picture in the target file, wherein the second color set is a color set of an unchanged picture in the target file.

15. The apparatus according to claim 10, wherein the collocated color determining module is configured for:
- determining a collocated color corresponding to each of colors in the target color set; and
- selecting a collocated color whose matching degree with each of the colors in the target color set is greater than a preset matching degree threshold to obtain the collocated color set.

16. The apparatus according to claim 10, wherein the color scheme generating module is configured for:
- determining at least one of a font color, a title color, a background color and a paragraph color of the target file by using a collocated color in the collocated color set, to obtain the color scheme of the target file.

* * * * *

UNITED STATES PATENT AND TRADEMARK OFFICE
CERTIFICATE OF CORRECTION

PATENT NO. : 11,361,475 B2  
APPLICATION NO. : 16/605448  
DATED : June 14, 2022  
INVENTOR(S) : Xian Zhou Page 1 of 1

It is certified that error appears in the above-identified patent and that said Letters Patent is hereby corrected as shown below:

On the Title Page

Replace Assignees: "Beijing Kingsoft Office Software, Inc.; Zhuhai Kingsoft Office Software, Inc.; Guangzhou Kingsoft Mobile Technology Co., Ltd." with --Beijing Kingsoft Office Software, Inc.; Zhuhai Kingsoft Office Software Co., Ltd.; Guangzhou Kingsoft Mobile Technology Co., Ltd.--

Signed and Sealed this  
Thirty-first Day of December, 2024

Derrick Brent  
*Acting Director of the United States Patent and Trademark Office*